Jan. 24, 1939.   E. A. HOOPES   2,145,115
THERMOSTATICALLY CONTROLLED WATER MIXER
Filed Sept. 14, 1936
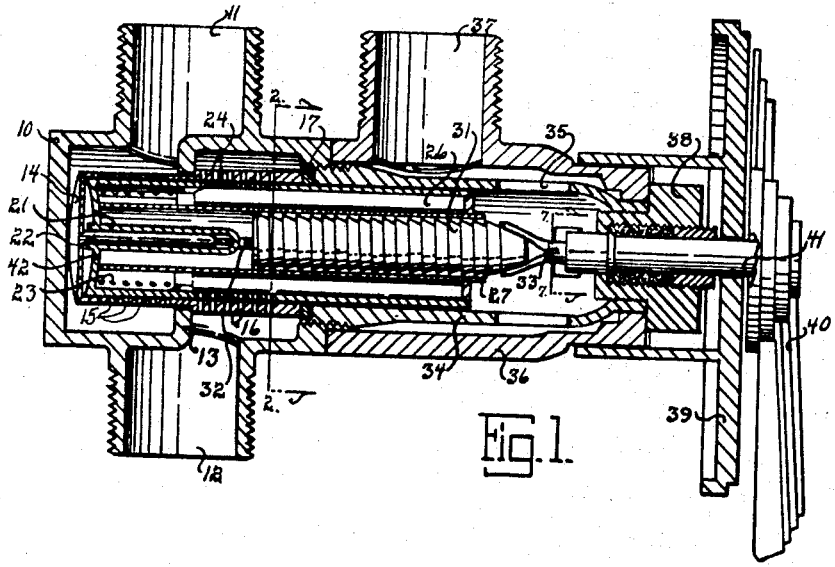
INVENTOR.
Ernest A. Hoopes
BY M. Talbert Dix
ATTORNEY.

Patented Jan. 24, 1939

2,145,115

UNITED STATES PATENT OFFICE 2,145,115

THERMOSTATICALLY CONTROLLED WATER MIXER

Ernest A. Hoopes, Des Moines, Iowa, assignor, by direct and mesne assignments, of three-eighths to Arthur W. Erskine, Cedar Rapids, Iowa, and one-eighth to Frank D. Clark, Des Moines, Iowa Application September 14, 1936, Serial No. 100,667

7 Claims. (Cl. 236—12)

The principal object of this invention is to provide a thermostatically controlled water mixer that mixes the hot and cold water in close proximity to the thermostatic element so that a uniform control of temperature of the outgoing water may be maintained without using a dash-pot or similar delaying means.

A further object of this invention is to provide a thermostatically controlled water mixer that is extremely sensitive to variations in the temperatures of water, rapid in its operation and uniform in its delivery of the desired temperature of water.

Still further objects of this invention are to provide a thermostatically controlled water mixer that is compact, flexible and positive in its control of the temperature of the mixed water.

A still further object of this invention is to provide a thermostatically controlled water mixer that is economical in manufacture, durable and efficient in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Fig. 1 is a side cross-sectional view of my complete device ready for use.

Fig. 2 is an enlarged cross-sectional view of my device taken on the line 2—2 of Fig. 1.

Fig. 3 is an enlarged side view of the water conductor tube of my device.

Fig. 4 is a side view of the flow control assembly or sleeve valve.

Fig. 5 is an enlarged end view of the stop ring and a cross-sectional view of a portion of the distributing tube within the stop ring.

Fig. 6 is an enlarged side partial sectional view of the thermostatic element.

Fig. 7 is an enlarged sectional view of the thermostat control element and is taken on the line 7—7 of Fig. 1.

Fig. 8 is a side view of the mixing tube of my device.

Referring to the drawing, I have used the numeral 10 to designate the cup element of my device having the cold water port 11 and the hot water port 12 in communication with the inside thereof.

The numeral 13 designates a flange about the inner peripheral surface of the cup 10 and bisecting the orifice of each of the ports 11 and 12 as shown in Fig. 1 of the drawing. It will here be noted that the forward part of the port 11 is blocked or closed so that water entering the port 11 will be directed to the rear portion of the cup 10 and also the rearward half of the port 12 is closed so that the water entering the port will be directed to the forward portion of the cup 10. The forward open end of the cup 10 is internally threaded as shown in the drawing. I have used the numeral 14 to designate the outer sleeve of the water control valve having its rearward end closed and its forward portion of larger diameter than its rearward portion so that it may be slipped into the flange 13 with the smaller end of the sleeve projecting into the rear portion of the cup 10. This sleeve 14 has two sets of holes cut therein, a rearward set 15 and a forward set 16. These holes are arranged in parallel rows and each row of holes 16 is in prolongation of the row of holes 15 as shown in Fig. 4 of the drawing. The numeral 17 designates a stop ring adjacent the open end of the sleeve 14 and having a pin 18 secured thereto which engages a hole in the end of the wall of the sleeve 14 as shown in Fig. 4. The numeral 19 designates a stop slot cut in the inner peripheral edge of the ring 17 as shown in Fig. 5 of the drawing. I have used the numeral 20 to designate a valve tube rotatably mounted in the sleeve 14 and having formed in its rearward end an elongated cup bearing 21 which receives a bearing support 22 secured to the inner central portion of the closed end of the sleeve 14 as shown in Fig. 1. The numeral 23 designates a plurality of holes arranged in parallel rows near the rearward end of the tube 20 and so disposed that they will coincide with the holes 15 of the sleeve 14 when the tube 20 is rotated a predetermined distance. The numeral 24 designates a plurality of holes arranged in longitudinal parallel relationship cut in the tube 20 and designed to coincide with the holes 16 in the sleeve 14 at times. The longitudinal center of each of the rows of holes 24 are so arranged that a continuation of the line will be directly between each row of holes 23 as shown in Fig. 4 of the drawing. The numeral 25 designates a lug secured to the tube 20 so as to engage the slot 19 of the ring 17. This lug and slot are so constructed and arranged that when the tube 20 is rotated to the right until the lug contacts the side of the slot the holes 15 and 23 will coincide and when the tube 20 is rotated to the left until stopped by the lug 25 hitting the other side of the slot 19, the holes 16 and 24 will coincide. I have used the numeral 26 to designate a longitudinally corrugated conductor tube having its rearward end secured within the tube 20 at a point between the holes 23 and 24 so that water passing through the holes 24 will pass along the outer corrugations or ducts of the conductor tube 26. I have used the numeral 27 to indicate a mixing tube extending through the center of the conductor tube 26 to the rear end of the tube 20 for directing the water entering the holes 23 along the inner passages or ducts of the conductor tube 26. The forward ends of the tube 20 and tube 26 are sealed to the outer end portion of the tube 27.

The numerals 28 indicate a plurality of holes cut through the outer corrugations of the tube 26 and coincide with the holes 29 cut in the tube 27. The numeral 30 indicates a plurality of holes cut in the tube 27 to allow the water flowing through the inner portion of the tube 26 to enter the inner side of the tube 27. The numeral 31 designates a thermostatic element. This thermostatic element 31 is constructed of a metallic ribbon that is highly sensitive to temperature changes and is helically wound so that each succeeding turn of the ribbon overlaps the one preceding it thus allowing each preceding turn to nest within the successive turns as each complete turn of the ribbon is of a generally conical shape as illustrated in Fig. 6 of the drawing.

This particular construction of a thermostatic element allows for a greater length of thermostatic material or metal to be condensed in the smallest possible space to make the thermostat as sensitive and as strong in its action as is possible. Also this construction allows the fluid to contact more of its surface in a shorter space giving prompt accurate action upon changes in temperature. This thermostatic element 31 is slidably or freely mounted within the forward end of the tube 27 and has rigidly secured on its rearward end a key 32 which engages slots in the bearing housing 21 for actuating the same. The numeral 33 designates a key rigidly secured to the other end of the thermostatic element 31 as shown in the drawing. The numeral 34 designates an extended nut which slidably embraces the tube 20 and which threads into the internal threads of the cup 10 thereby tightening the ring 17 and the sleeve 14 within the cup and preventing their rotation. The numerals 35 designate exit ports cut through walls of the nut 34 near its forward portion.

I have used the numeral 36 to designate a sleeve rotatably mounted about the outside of the nut 34 and which has a water outlet port 37, in communication with its interior. It will be noted that there is considerable chamber between the nut 34 and the sleeve 36 to allow water to come out of the slots 35 and flow out through the outlet port 37. The numeral 38 designates a packing gland nut which is threaded into the end of the nut 34 and whose head overlaps the end of the sleeve 36 thereby holding the assembly in alignment. The numeral 39 designates a dial plate of the ordinary type which is secured to the forward end of the completed assembly. The numeral 40 designates a shaft having one end in engagement with the key 33 of the thermostatic element and which passes through the ordinary packing gland 38 and has secured to its outer end portion a manually operated lever 41 as shown in Fig. 1 of the drawing. The numeral 42 is used to designate a small hole or opening cut in the rearward end portion of the tube 20 to prevent back pressure should by any chance water leak into this portion of the sleeve valve.

The practical operation of my device is as follows: The port 11 is connected to a suitable source of cold water under pressure, the port 12 is connected to a suitable source of hot water under pressure, and the outlet port 37 is placed in communication with an outlet such as a water faucet, shower bath or the like. The control handle 41 is turned to the desired degree of temperature thereby tightening or loosening the coil of the thermostatic element 31 and the water is allowed to enter the device through valves, faucets, or the like. The cold water will pass through the holes 15 and the holes 23 and thence will pass along the tube 27 and the inner passageways of the tube 26, thence through the holes 30 of the tube 27 on to the thermostatic element 31. The action of this cold water upon this thermostatic element will cause it to contract, thereby turning the housing 21 and the tube 20 to the left, thereby bringing the holes 15 and 23 out of alignment and bringing the holes 16 and 24 into alignment allowing hot water to travel down the outside ducts of the tube 26 through the holes 28, thence through the holes 29 of the tube 27 and on to the thermostatic element 31. It will be noted that the function of the slot 19 and lug 25 is to provide a stop at either extreme rotation of the tube 20 so that the holes 16 and 24 will be in alignment when the tube 20 is rotated to the left and the holes 15 and 23 will be in alignment when the tube 20 is rotated to the right. Thus it will be seen that the function of the conductor tube 26 is to carry the hot and cold water in separate streams allowing it to come through the holes 28, 29 and 30 of the tube 27 and mix the hot and cold water directly on the thermostatic element 31. The slightest fluctuation or variance in temperature of the water being mixed is immediately impressed upon the thermostatic element and it will turn in the desired direction to admit more hot or more cold water, as the case may be, to maintain a uniform temperature of out-flowing water. The water flows past and through the thermostatic element 31 out through the slots 35 of the elongated nut 34 into the sleeve 36 and thence back and out through the port 37. It will be noted that the holes in the tube 27 are spaced so that all water coming through them must contact the thermostatic element, thus providing a quickly responsive thermostatic control. By the specific construction of my thermostatic element, a great amount of surface is exposed to the water as the water will flow between each succeeding turn of the element as well as around the completed element. This type of element permits the use of a length of temperature sensitive material great enough to give the necessary action while at the same time in such a compact form that it may be presented to the device at the exact point of mix of the hot and cold water. The lever 41 tightens or loosens the coil of the element 31 to provide a balance in the direction of the desired temperature and when once set will keep the water flowing through the outlet 37 within very close limits of the temperature desired to be obtained. Thus it will be seen that I have provided a thermostatically controlled water mixer that is compact in structure, that eliminates the use of a dashpot in the mixing of the hot and cold water, that mixes the hot and cold water in proximity to the thermostatic control unit so that not lag or delay is experienced in the control of temperature as the thermostat will immediately act in response to changes in temperature. Furthermore, my device is easily assembled or disassembled for inspection or repair, it is simple in structure, and maintains the temperature of the outgoing water with accuracy and efficiency.

Some changes may be made in the construction and arrangement of my improved thermostatically controlled water mixer without departing from the real spirit and purpose of my invention and it is my intention to cover by my claims any modified forms of structure or use of mechanical equivalents which may be reasonably included within their scope.

I claim:

1. In a hot and cold water mixer, a housing, a cold water inlet in said housing designed to be in communication with a source of cold water under pressure, a hot water inlet in said housing designed to be in communication with a source of hot water under pressure, an outlet in said housing, a sleeve valve in said housing imposed between said inlets and said outlet capable of selectively regulating the amounts of hot and cold water passing into said housing through said inlets, a mixing tube in said housing, a conduit for conducting said hot water to said mixing tube, a conduit for conducting cold water to said mixing tube, a thermostatic element in said mixing tube having one end operatively secured to said sleeve valve for selectively regulating the amounts of hot and cold water entering said mixing tube, and a means for adjustably securing the other end of said thermostatic element.

2. In a hot and cold water mixer, a housing, a cold water inlet in said housing designed to be in communication with a source of cold water under pressure, a hot water inlet in said housing designed to be in communication with a source of hot water under pressure, an outlet in said housing, a sleeve valve in said housing imposed between said inlets and said outlet capable of selectively regulating the amounts of hot and cold water passing into said housing through said inlets, a mixing tube in said housing, a longitudinally corrugated conductor tube in said sleeve valve providing successive hot and cold water ducts for separately conducting hot and cold water to said mixing tube, and a thermostatic element adjacent said tube having one end operatively connected to said sleeve valve for causing said sleeve valve to selectively regulate the amounts of hot and cold water entering the mixing tube.

3. In a hot and cold water mixer, a housing, a cold water inlet in said housing designed to be in communication with a source of cold water under pressure, a hot water inlet in said housing designed to be in communication with a source of hot water under pressure, an outlet in said housing, a sleeve valve in said housing imposed between said inlets and said outlet capable of selectively regulating the amounts of hot and cold water passing into said housing through said inlets, a mixing tube in said housing, a conduit for conducting hot water to said mixing tube, a conduit for conducting cold water to said mixing tube, and a thermostatic element in said mixing tube constructed of a flat thermo-sensitive material helically wound in successively overlapping conical coils and operatively secured to said sleeve valve for selectively regulating the flow of hot and cold water into said mixing tube.

4. In a water mixer, a housing, a cold water port in communication with the inside of said housing, a hot water port in communication with the inside of said housing, an outlet port in communication with the inside of said housing, a sleeve valve inside said housing between said inlet ports and said outlet port and so designed that when actuated in one direction will allow cold water to enter said valve and when actuated in the other direction will allow hot water to flow through said valve, a mixing tube inside of said valve and in communication therewith, a conduit for conducting said hot water to said mixing tube, a conduit for conducting cold water to said mixing tube, a thermostatic element so arranged in said mixing tube that the water entering the tube will pass adjacent to it, a means for holding one end of said thermostatic element, and a means for operatively securing the other end of said element to said sleeve valve to actuate said valve in one direction of its movement when subjected to a warm temperature and actuating said sleeve valve in the other direction of its movement when subjected to cold temperature for controlling the temperature of the mixed water flowing from said outlet port.

5. In a water mixer designed to be in communication with a source of hot water under pressure and a source of cold water under pressure, a sleeve valve for selectively admitting either hot or cold water, a mixing tube, a means for conducting cold water into said mixing tube, a means for conducting hot water into said mixing tube, a thermostatic element arranged in said mixing tube in proximity to the water entry point of said tube; said thermostatic element being constructed of a flat metallic temperature-sensitive material helically wound in overlapping conical arrangement; a means for operatively securing one end of said thermostatic element to said sleeve valve, a means for adjustably retaining the other end of said sleeve element; said thermostatic element operating said sleeve valve to admit hot water to said mixing tube when it is subjected to cold and to admit cold water to said mixing tube when it is subjected to heat; and a water outlet port in communication with said mixing tube.

6. In a hot and cold water mixer, a housing, a cold water inlet in said housing designed to be in communication with a source of cold water under pressure, a hot water inlet in said housing designed to be in communication with a source of hot water under pressure, an outlet in said housing, a valve in said housing imposed between said inlets and said outlet capable of selectively regulating the amounts of hot and cold water passing into said housing through said inlets, a mixing tube in said housing, a longitudinally corrugated conductor tube in said valve providing successive hot and cold water ducts for separately conducting hot and cold water to said mixing tube, and a thermostatic element adjacent said tube having one end operatively connected to said valve for causing said valve to selectively regulate the amounts of hot and cold water entering the mixing tube.

7. In a hot and cold water mixer, a housing, a cold water inlet in said housing designed to be in communication with a source of cold water under pressure, a hot water inlet in said housing designed to be in communication with a source of hot water under pressure, an outlet in said housing, a valve in said housing imposed between said inlets and said outlet capable of selectively regulating the amounts of hot and cold water passing into said housing through said inlets, a mixing tube in said housing, and a thermostatic element in said mixing tube constructed of a flat thermo-sensitive material helically wound in successively overlapping conical coils and operatively secured to said valve for selectively regulating the flow of hot and cold water into said mixing tube.

ERNEST A. HOOPES.